(12) United States Patent
Jeong et al.

(10) Patent No.: US 10,534,953 B2
(45) Date of Patent: Jan. 14, 2020

(54) ELECTRONIC APPARATUS AND CONTROL METHOD THEREOF

(71) Applicant: Samsung Electronics Co., Ltd., Suwon-si, Gyeonggi-do (KR)

(72) Inventors: Jin-gu Jeong, Seongnam-si (KR); Sang-wook Yoo, Suwon-si (KR); Yong-joon Choe, Seoul (KR); Ha-ram O, Seoul (KR); Sang-hyun Lee, Seoul (KR); Kyong-tae Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 135 days.

(21) Appl. No.: 15/812,356

(22) Filed: Nov. 14, 2017

(65) Prior Publication Data

US 2018/0137341 A1    May 17, 2018

Related U.S. Application Data

(60) Provisional application No. 62/421,637, filed on Nov. 14, 2016.

(30) Foreign Application Priority Data

Jan. 2, 2017   (KR) .................. 10-2017-0000180

(51) Int. Cl.
    *G06K 9/00*    (2006.01)
(52) U.S. Cl.
    CPC ..... *G06K 9/00228* (2013.01); *G06K 9/00268* (2013.01)

(58) Field of Classification Search
    None
    See application file for complete search history.

(56) References Cited

U.S. PATENT DOCUMENTS

7,218,759 B1   5/2007   Ho et al.
9,256,963 B2   2/2016   Cummins et al.
               (Continued)

FOREIGN PATENT DOCUMENTS

KR         10-0400870 B1     9/2003
KR      10-2012-0009877 A    2/2012
KR         20160007754    *  10/2016

OTHER PUBLICATIONS

English translation of KR20160007754 (Year: 2016).*
(Continued)

*Primary Examiner* — Hadi Akhavannik
(74) *Attorney, Agent, or Firm* — Jefferson IP Law, LLP

(57) ABSTRACT

An electronic apparatus for illuminating and photographing a user's face and a control method thereof are provided. The electronic apparatus includes a camera configured to photograph a user's face, a transceiver configured to perform communication with a user terminal, and at least one processor configured to photograph the user's face a plurality of times on the basis of a plurality of photographing parameters to obtain a plurality of images, extract face regions corresponding to each of the plurality of images photographed on the basis of the plurality of photographing parameters, synthesize the extracted user's face regions with each other to create a synthesized image, and control the transceiver to transmit data on the synthesized image to the user terminal for the purpose of skin analysis for the user's face.

17 Claims, 16 Drawing Sheets

(56) References Cited

U.S. PATENT DOCUMENTS

| | | | | |
|---|---|---|---|---|
| 2010/0053222 A1* | 3/2010 | Kerofsky | ............ | G09G 3/3406 345/690 |
| 2012/0176517 A1* | 7/2012 | Lee | ................... | H04N 5/23219 348/240.99 |
| 2014/0049611 A1* | 2/2014 | Woo | ................... | H04N 5/23229 348/46 |
| 2015/0098662 A1* | 4/2015 | Sasaki | ..................... | G06T 5/002 382/264 |

OTHER PUBLICATIONS

Canfield Scientific; VISIA-CR; "Facial Imaging System for Clinical Research"; https://www.canfieldsci.com/imaging-systems/visia-cr/; pp. 1-6; internet download Nov. 7, 2017.

* cited by examiner

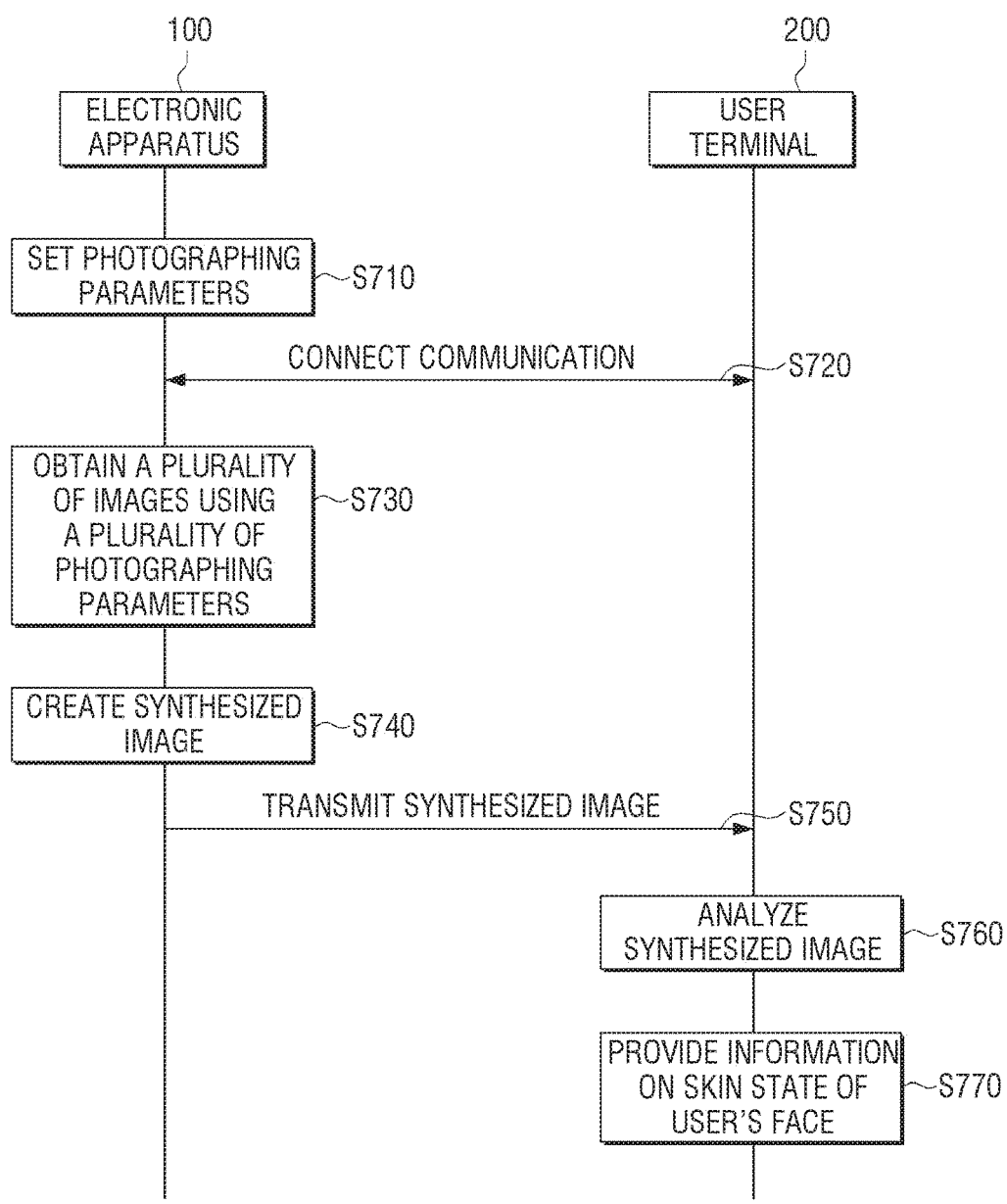

ELECTRONIC APPARATUS AND CONTROL METHOD THEREOF

CROSS-REFERENCE TO RELATED APPLICATION(S)

This application claims the benefit under 35 U.S.C. § 119(e) of a U.S. Provisional application filed on Nov. 14, 2016 in the U.S. Patent and Trademark Office and assigned Ser. No. 62/421,637, and under 35 U.S.C. § 119(a) of a Korean patent application filed on Jan. 2, 2017 in the Korean Intellectual Property Office and assigned Serial number 10-2017-0000180, the disclosure of which is hereby incorporated by reference.

TECHNICAL FIELD

The present disclosure relates to an electronic apparatus and a control method thereof. More particularly, the present disclosure relates to an electronic apparatus obtaining an image for analyzing the skin of a user's face by photographing the user's face a plurality of times, and a control method thereof.

BACKGROUND

Recently, in accordance with an increase in interest in beauty, an interest in skin care of a user's face has increased. Particularly, an electronic apparatus for photographing the skin of the user's face to analyze various skin troubles (for example, a wrinkle, a pore, a pimple, and the like) existing on the user's face has been developed.

Such an electronic apparatus for analyzing skin according to the related art photographs the user's face on the basis of predetermined photographing parameters (for example, an intensity of a light source, a direction of the light source, an F No, a shutter speed, and the like) in a state in which the user's face is put into the electronic apparatus to shield external illumination. That is, the electronic apparatus for analyzing skin according to the related art typically photographs the user's face in a state in which external illumination is blocked and illumination is uniformly spread over the entirety of the user's face through light reflection in the electronic apparatus.

However, if an intensity of a light source is weak when the user's face is photographed, it is difficult to distinguish between a dark portion and pigmentation at the time of analyzing an image. If an intensity of the light source is strong when the user's face is photographed, there is a problem in that image information on a specific region can be lost. In addition, the electronic apparatus for analyzing skin according to the related art has a form in which it surrounds the entirety of the user's face and therefore, has a large size, and it is thus inconvenient to carry the electronic apparatus for analyzing skin according to the related art.

The above information is presented as background information only, to assist with an understanding of the present disclosure. No determination has been made, and no assertion is made, as to whether any of the above might be applicable as prior art with regard to the present disclosure.

SUMMARY

Aspects of the present disclosure are to address at least the abovementioned problems and/or disadvantages, and to provide at least the advantages described below. Accordingly, an aspect of the present disclosure is to provide an electronic apparatus and method for obtaining a plurality of images by photographing a user's skin a plurality of times on the basis of a plurality of photographing parameters and synthesizing the plurality of images with each other to be one face image for analyzing the skin.

In accordance with an aspect of the present disclosure, an electronic apparatus is provided. The electronic apparatus includes a camera configured to photograph a user's face, a transceiver configured to perform communication with a user terminal, and at least one processor configured to control the camera to photograph the user's face a plurality of times on the basis of a plurality of photographing parameters to obtain a plurality of images, extract face regions corresponding to each of the plurality of images photographed on the basis of the plurality of photographing parameters, synthesize the extracted face regions with each other to create a synthesized image, and control the transceiver to transmit data on the synthesized image to the user terminal for the purpose of skin analysis for the user's face.

In accordance with another aspect of the present disclosure, a control method of an electronic apparatus is provided. The control method includes photographing a user's face a plurality of times on the basis of a plurality of photographing parameters to obtain a plurality of images, extracting face regions corresponding to each of the plurality of images photographed on the basis of the plurality of photographing parameters and synthesizing the extracted face regions with each other to create a synthesized image, and transmitting data on the synthesized image to a user terminal for the purpose of skin analysis for the user's face.

In accordance with another aspect of the present disclosure a non-transitory computer-readable recording medium in which a program for executing a control method of an electronic apparatus is stored is provided. The control method includes photographing a user's face a plurality of times on the basis of a plurality of photographing parameters to obtain a plurality of images, extracting face regions corresponding to each of the plurality of images photographed on the basis of the plurality of photographing parameters and synthesizing the extracted face regions with each other to create a synthesized image, and analyzing the synthesized image to decide a skin state of the user's face, and providing information on the skin state.

As described above, according to the various embodiments of the present disclosure, a face image having a uniform brightness distribution over an entire region of a user's face may be obtained to increase accuracy of a face skin analyzing result. In addition, since the user's face does not need to be inserted into the electronic apparatus, the electronic apparatus may be manufactured having a small size and a light weight, such that convenience in carrying the electronic apparatus may be improved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 is a sequence diagram for describing a control method of a system for analyzing the skin of a user's face according to an embodiment of the present disclosure.

Throughout the drawings, it should be noted that like reference numbers are used to depict the same or similar elements, features, and structures.

DETAILED DESCRIPTION

Figure 1:
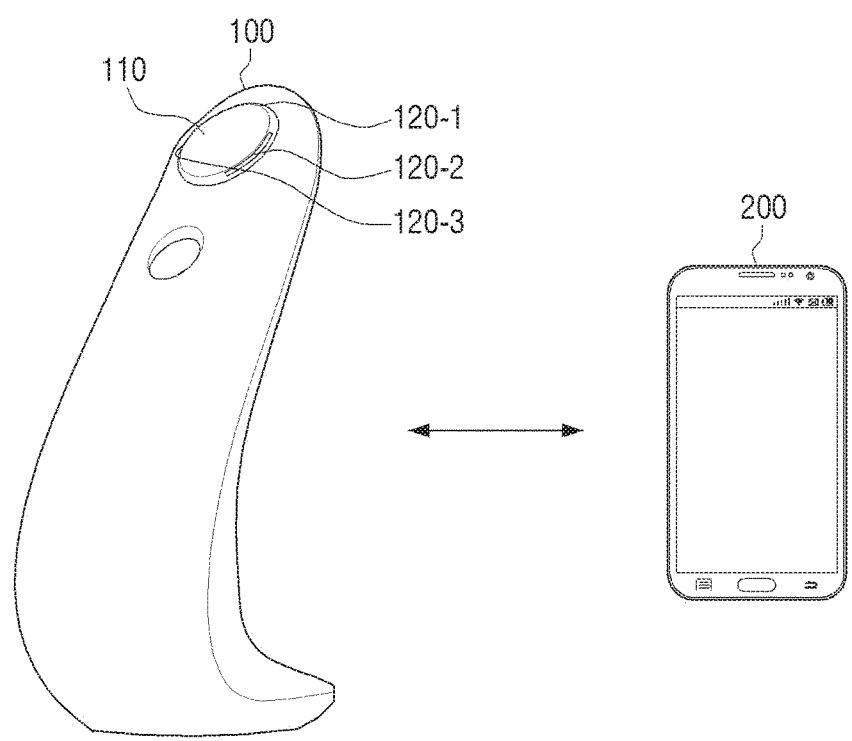
FIG. 1 is a view for describing a system for analyzing a user's skin according to an embodiment of the present disclosure.

The following description with reference to the accompanying drawings is provided to assist in a comprehensive understanding of various embodiments as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms 'first', 'second', and the like, may be used to describe various components, but the components are not to be construed as being limited by the terms. The terms are used only to distinguish one component from another component.

Singular forms are intended to include plural forms unless the context clearly indicates otherwise. It will be further understood that terms "include" or "formed of" used in the present specification specify the presence of features, numerals, steps, operations, components, parts, or combinations thereof mentioned in the present specification, but do not preclude the presence or addition of one or more other features, numerals, steps, operations, components, parts, or combinations thereof.

In various embodiments of the present disclosure, a 'module' or an '~er/~or' may perform at least one function or operation, and be implemented by hardware or software or be implemented by a combination of hardware and software. In addition, a plurality of 'modules' or a plurality of '~ers/~ors' may be integrated in at least one module and be implemented by at least one processor (not illustrated) except for a 'module' or an '~er/or' that needs to be implemented by specific hardware.

In various embodiments of the present disclosure, a case in which any portion is referred to as being "connected to" another portion not only includes a case in which any one portion and another portion are "directly connected to" each other, but also a case in which any one portion and another portion are "electrically connected to" each other with the other portion interposed therebetween. In addition, it not only includes a case in which any one portion and another portion are physically connected to each other, but also a case in which any one portion and another portion are wirelessly connected to each other. Unless explicitly described to the contrary, "including" any component will be understood to imply the inclusion of other components rather than the exclusion of other components.

Hereinafter, various embodiments of the present disclosure will be described in detail with reference to the accompanying drawings so that those skilled in the art to which the present disclosure pertains may easily practice the present disclosure. However, the present disclosure may be implemented in various different forms and is not limited to various embodiments described herein. In addition, in the drawings, portions unrelated to the description may be omitted to describe the present disclosure, and similar portions will be denoted by similar reference numerals throughout the specification.

Hereinafter, the present disclosure will be described in detail with reference to the drawings.

FIG. 1 is a view for describing a system for analyzing a user's skin according to an embodiment of the present disclosure.

Referring to FIG. 1, a system may include an electronic apparatus 100 and a user terminal 200. Here, the electronic apparatus 100 may be a dedicated apparatus for photographing the user's skin. However, this is only an example, and the electronic apparatus 100 may be implemented by another electronic apparatus (for example, a smartphone, or the like) including a camera and a light source. The user terminal 200 may be implemented by a smartphone. However, this is only an example, and the user terminal 200 may be implemented by various terminals such as a tablet personal computer (PC), a laptop PC, a desktop PC, and the like.

The electronic apparatus 100 may set a plurality of photographing parameters for analyzing the user's skin. In detail, the electronic apparatus 100 may photograph a user's face a plurality of times on the basis of a plurality of preliminary photographing parameters, and analyze brightness of a plurality of images photographed on the basis of the plurality of preliminary photographing parameters to set preliminary photographing parameters corresponding to a plurality of user's face regions among the plurality of preliminary photographing parameters to the plurality of photographing parameters. In addition, the electronic apparatus 100 may store the plurality of photographing parameters that are set.

In addition, the electronic apparatus 100 may photograph the user's face a plurality of times on the basis of the plurality of photographing parameters to obtain a plurality of images.

In addition, the electronic apparatus 100 may extract user's face regions corresponding to each of the plurality of images photographed on the basis of the plurality of photographing parameters, and synthesize the extracted user's face regions with each other.

In addition, the electronic apparatus 100 may transmit data on a synthesized image to the user terminal 200 for the purpose of skin analysis for the user's face.

The user terminal 200 may decide a skin state of the user's face on the basis of the data of the synthesized image. In addition, the user terminal 200 may analyze whether or not skin troubles (for example, a wrinkle, a pimple, a pore, skin cancer, and the like) exist on the user's face through image analysis.

The user terminal 200 may provide information on the skin state of the user's face.

A case in which the electronic apparatus 100 transmits the data on the synthesized image to the user terminal 200 is described in the abovementioned embodiment, but this is only an example, and the electronic apparatus 100 may analyze the data on the synthesized image to decide the skin state of the user's face and output information on the decided skin state.

Figure 2:
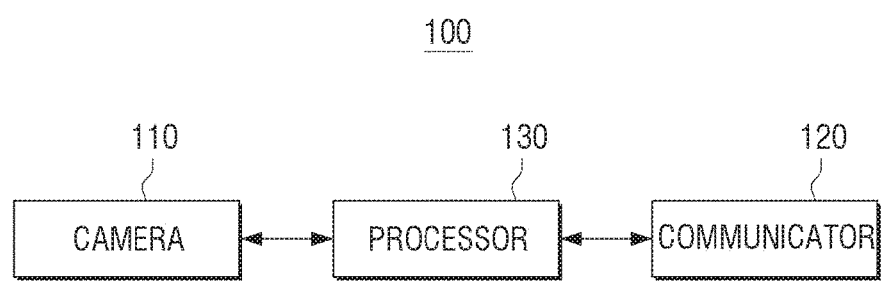
FIG. 2 is a block diagram schematically illustrating components of an electronic apparatus according to an embodiment of the present disclosure.

FIG. 2 is a block diagram schematically illustrating components of an electronic apparatus 100 according to an embodiment of the present disclosure.

Referring FIG. 2, the electronic apparatus 100 includes a camera 110, a communicator 120, and a processor 130.

The camera 110 photographs the user's face. In detail, the camera 110 may photograph the user's face on the basis of the plurality of photographing parameters to obtain a plurality of images.

The communicator 120 performs communication with an external apparatus. Particularly, the communicator 120 may transmit a synthesized image obtained by extracting a plurality of regions from the plurality of images photographed on the basis of the plurality of photographing parameters and synthesizing the extracted regions with each other to the user terminal 200. The communicator can include a transceiver or similar element to provide such wired or wireless transmission.

At least one processor 130 controls a general operation of the electronic apparatus 100. Particularly, the processor 130 may photograph the user's face a plurality of times on the basis of the plurality of photographing parameters to obtain the plurality of images, extract the user's face regions corresponding to each of the plurality of images photographed on the basis of the plurality of photographing parameters, synthesize the extracted user's face regions with each other to create the synthesized image, and control the communicator 120 to transmit the data on the synthesized image to the user terminal 200 for the purpose of skin analysis for the user's face.

First, the processor 130 sets the photographing parameters for analyzing the skin of the user's face. In detail, the processor 130 may photograph the user's face a plurality of times on the basis of the plurality of preliminary photographing parameters. Here, the plurality of preliminary photographing parameters may be determined depending on an external illumination environment. In addition, the processor 130 may analyze the brightness of the plurality of images photographed on the basis of the plurality of preliminary photographing parameters to set the preliminary photographing parameters corresponding to the plurality of user's face regions among the plurality of preliminary photographing parameters to the plurality of photographing parameters.

As an embodiment of the present disclosure, in the case in which an image photographed on the basis of a first preliminary photographing parameter of the plurality of preliminary photographing parameters has a brightness value in a predetermined range with respect to a first region of the user's face (for example, a central region of the user's face), the processor 130 may set the first preliminary photographing parameter to a first photographing parameter corresponding to the first region of the user's face. In the case in which an image photographed on the basis of a second preliminary photographing parameter of the plurality of preliminary photographing parameters has a brightness value in a predetermined range with respect to a second region of the user's face (for example, an outer region of the user's face), the processor 130 may set the second preliminary photographing parameter to a second photographing parameter corresponding to the second region of the user's face.

Here, the photographing parameters may include at least one of an intensity of the light source included in the electronic apparatus 100, a direction of the light source, a shutter speed, and an F No, and may be set to be different from each other for each of different users.

After the plurality of photographing parameters are set, the processor 130 may photograph the user's face a plurality of times on the basis of the plurality of photographing parameters that are set to obtain the plurality of images. As an embodiment of the present disclosure, the processor 130 may photograph the user's face on the basis of the first photographing parameter to obtain a first image, and photograph the user's face on the basis of the second photographing parameter to obtain a second image.

In addition, the processor 130 may extract the user's face regions corresponding to each of the plurality of images from the plurality of images and synthesize the extracted user's face regions with each other to obtain the synthesized image. As an embodiment of the present disclosure, the processor 130 may extract the first region of the user's face from the first image photographed on the basis of the first photographing parameter, and extract the second region of the user's face from the second image photographed on the basis of the second photographing parameter. In addition, the processor 130 may synthesize the extracted first and second regions with each other to obtain a synthesized image.

In this case, the processor 130 may also correct the first and second regions depending on sensed motion information of the electronic apparatus, and then synthesize the corrected first and second regions with each other. That is, in the case in which motion of the electronic apparatus 100 or the user is sensed during a period in which the second image is photographed, the processor 130 may correct the second region depending on the sensed motion of the electronic apparatus or user. According to another embodiment, the processor 130 may correct the second image before extracting the second region, depending on the motion of the electronic apparatus 100.

In addition, when the processor 130 synthesizes the first and second regions with each other, the processor 130 may perform brightness correction and then synthesize the extracted first and second regions with each other. In detail, the processor 130 may decide a brightness value difference between the first region and the second region in the vicinity of a boundary between the first region and the second region. In addition, the processor 130 may decide a synthesis weight for at least one of the first region and the second region on the basis of the brightness value difference. Here, the synthesis weight may be a weight for adjusting brightness. In addition, the processor 130 may adjust brightness of at least one of the first region and the second region on the basis of the synthesis weight, and then synthesize the first region and the second region with each other.

In addition, the processor 130 may control the communicator 120 to transmit the synthesized image to the user terminal 200.

A case in which the electronic apparatus 100 transmits the synthesized image to the user terminal 200 is described in the abovementioned embodiment, but this is only an example, and the electronic apparatus 100 may transmit the plurality of images obtained on the basis of the plurality of photographing parameters to the user terminal 200. In this case, the user terminal 200 may synthesize the plurality of images with each other by the method or methods as described above to analyze the skin state of the user's face.

According to another embodiment of the present disclosure, the processor 130 may directly analyze the synthesized image to obtain skin state information on at least one of pigmentation, a pimple, sebum, a pore, and a wrinkle existing on the user's face and output the obtained skin state information.

Figure 3:
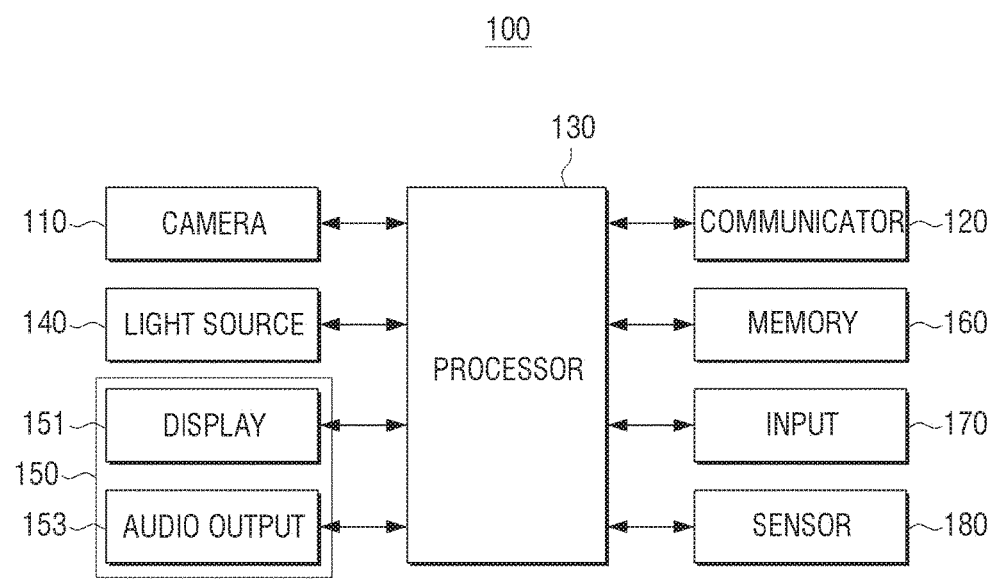
FIG. 3 is a block diagram illustrating components of an electronic apparatus according to an embodiment of the present disclosure in detail.

FIG. 3 is a block diagram illustrating components of an electronic apparatus according to an embodiment of the present disclosure in detail.

Referring to FIG. 3, the electronic apparatus 100 may include the camera 110, the communicator 120, a light source 140, an output 150, a memory 160, an input 170, a sensor 180, and the processor 130. Since the components of the electronic apparatus 100 illustrated in FIG. 3 are only an example, they are not necessarily limited to those of the block diagram illustrated in FIG. 3. Therefore, some of the components of the electronic apparatus 100 illustrated in FIG. 3 may be omitted, modified, or added depending on a kind of electronic apparatus 100 or a purpose of the electronic apparatus 100.

The camera 110 may be positioned on an upper end of a front surface of the electronic apparatus 100, surrounded by communicator features 120-1, 120-2 and 120-3, as illustrated in FIG. 1, and may photograph the user's face. In this case, the camera 110 may photograph the user's face a plurality of times on the basis of different photographing parameters (for example, a shutter speed value, an F No, and the like) to obtain the plurality of images.

The light source 140 provides light toward the user's face. Particularly, a plurality of light sources 140 may be provided in the vicinity of the camera 110. In addition, the light source 140 may provide light having different intensities, shades (wavelengths) and so forth, depending on a control of the processor 130 during a period in which the user's face is photographed.

The output 150 outputs various information. Particularly, the output 150 may include a display 151 and an audio output 153, as illustrated in FIG. 3.

The display 151 displays various image data and user interfaces (UIs). The display 151 may also provide information on the skin state of the user's face.

According to an embodiment of the present disclosure, in the case in which the electronic apparatus 100 is implemented by a portable terminal such as a smartphone, the display 151 may be coupled to a touch panel to be implemented as a touch screen, and may have a form of a flexible display to be coupled to at least one of a front surface region, a side surface region, and a rear surface region of the electronic apparatus 100. The flexible display may be bent, curved, or rolled without being damaged through the use of a thin and flexible substrate like paper.

The audio output 153 is a component outputting various alarms or audio messages as well as various audio data on which various processes such as decoding, amplification, noise filtering, and the like, are performed by an audio processor (not illustrated). According to another embodiment of the present disclosure, the electronic apparatus 100 may further include an output terminal as a component for outputting an audio.

Particularly, the audio output 153 may provide information on the skin state of the user's face in an audio form.

The communicator 120 may perform communication with the user terminal 200. Particularly, the communicator 120 may receive a request for the photographing of the user's face from the user terminal 200, and transmit the synthesized image to the user terminal 200. In this case, the communicator 120 may be implemented by a Bluetooth module, but this is only an example, and the communicator 120 may be implemented by various communication modules such as a Zigbee communication module, a wireless fidelity (WiFi) communication module, a near field communication (NFC) communication module, and the like.

The memory 160 stores various modules for driving the electronic apparatus 100 therein. For example, software including a base module, a sensing module, a communication module, a presentation module, a web browser module, and a service module may be stored in the memory 160. Here, the base module is a basic module processing signals transferred from hardware included in the electronic apparatus 100 and transferring the processed signals to an upper layer module. The sensing module, which is a module collecting information from various sensors and analyzing and managing the collected information, may include a face recognizing module, an audio recognizing module, a motion recognizing module, and the like. The presentation module, which is a module for configuring a display screen, may include a multimedia module for reproducing and outputting a multimedia content and a user interface (UI) rendering module performing UI and graphic processing. The communication module is a module for performing communication with the outside. The web browser module is a module performing web browsing to access a web server. The service module is a module including various applications for providing various services.

As described above, the memory 160 may include various program modules. However, some of the various program modules may be omitted, modified, or added depending on a kind and a property of electronic apparatus 100.

In addition, the memory 160 may store a plurality of photographing parameters for each user therein.

The memory 160 may be implemented by a non-volatile memory, a volatile memory, a flash memory, a hard disk drive (HDD), a solid state drive (SDD), or the like. The memory 160 is accessed by the processor 130, and readout, recording, correction, deletion, update, and the like, of data in the memory 160 may be performed by the processor 130. In the present disclosure, the term 'memory' includes the memory 160, a read only memory (ROM) (not illustrated) in the processor 130, a random access memory (RAM) (not illustrated), or a memory card (not illustrated) (for example, a micro secure digital (SD) card or a memory stick) mounted in the electronic apparatus 100.

The input 170 may input a user command for manipulating the electronic apparatus 100, and transmit information on the user command to the processor 130. Particularly, the input 170 may be a button (for example, a button for performing photographing, or the like) included in the electronic apparatus 100, but this is only an example, and the input 170 may be implemented by any number of other input devices.

As an embodiment of the present disclosure, the input 170 may be implemented by a touch panel for sensing a user touch, a (digital) pen sensor, or the like. The touch panel may use at least one of, for example, a capacitive manner, a resistive manner, an infrared manner, or an ultrasonic manner. In addition, the touch panel may further include a control circuit. However, a case in which the input 170 is implemented by the touch panel, the pen sensor, or the like, is only an example, and the input 170 may be implemented by various electronic devices such as a microphone for receiving user utterance, a pointing device, and the like.

The sensor 180 includes various sensors for sensing a state of the electronic apparatus 100. Particularly, the sensor 180 may include a motion sensor (for example, an acceleration sensor, a gyro sensor, a terrestrial magnetism sensor, an electromagnetic sensor, or the like) for sensing motion of the electronic apparatus 100, an illuminance sensor for sensing an illumination environment around the electronic apparatus 100, and the like.

The processor 130 may be electrically connected to various components (for example, the output 150, the memory 160, the camera 110, and the like) of the electronic apparatus 100 to control a general operation and function of the electronic apparatus 100. Particularly, the processor 130 may control the general operation of the electronic apparatus 100 using various programs stored in the memory 160.

In detail, the processor 130 may photograph the user's face a plurality of times on the basis of the plurality of photographing parameters to obtain the plurality of images, extract the user's face regions corresponding to each of the plurality of images photographed on the basis of the plurality of photographing parameters, synthesize the extracted user's face regions with each other to create the synthesized image, and control the communicator 120 to transmit the synthesized image to the user terminal 200 for the purpose of the skin analysis for the user's face.

An embodiment in which the processor 130 interworks with the user terminal 200 to provide the information on the skin state of the user's face will be described in detail with reference to FIGS. 4A to 6E.

Figure 4A:
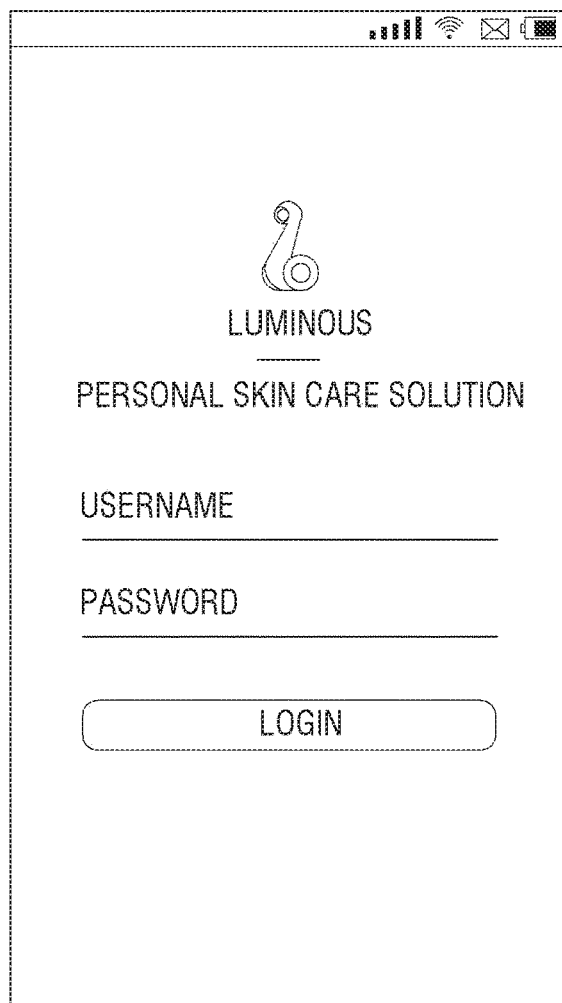
FIGS. 4A and 4B are views for describing examples of analyzing a user's skin using a skin analyzing application according to an embodiment of the present disclosure.
Figure 4B:

FIGS. 4A and 4B are views for describing examples of analyzing a user's skin using a skin analyzing application according to an embodiment of the present disclosure.

Referring to FIG. 4A, the user terminal 200 may execute a skin analyzing application in response to a user command, and display a start screen of the skin analyzing application, as illustrated in FIG. 4A. In this case, a UI for user login may be included in the start screen of the skin analyzing application.

Referring to FIG. 4B, when the user login is performed, the user terminal 200 may search the electronic apparatus 100 with which it may communicate. In this case, the user terminal 200 may display a screen guiding the search of the electronic apparatus 100, as illustrated in FIG. 4B.

In the case in which the electronic apparatus 100 is searched, the user terminal 200 may perform the communication with the electronic apparatus 100. In this case, the user terminal 200 may perform the communication with the electronic apparatus 100 using Bluetooth communication. In the case in which the communication between the user terminal 200 and the electronic apparatus 100 is connected, the user terminal 200 may transmit information on a logged-in user to the electronic apparatus 100.

The processor 130 of the electronic apparatus 100 decides whether or not a plurality of photographing parameters for the logged-in user are predetermined.

In the case in which the plurality of photographing parameters corresponding to the logged-in user are not set, the processor 130 may set a plurality of photographing parameters corresponding to the user's face regions among a plurality of preliminary photographing parameters.

In detail, the processor 130 may photograph a user's face on the basis of the plurality of preliminary photographing parameters through the camera 110 to obtain a plurality of images. For example, the processor 130 may photograph the user's face on the basis of first to n-th preliminary photographing parameters to obtain first to n-th images. Here, the preliminary photographing parameters may include an intensity of the light source 140, a direction of the light source 140, a shutter speed of the camera 110, an F No, an exposure value, and the like, and may be determined depending on external illumination sensed by the sensor 180.

A case in which the plurality of images are obtained by photographing the user's face on the basis of the plurality of preliminary photographing parameters is described in the abovementioned embodiment, but this is only an example, and a moving picture may be obtained by photographing the user's face while changing the preliminary photographing parameters in real time.

In addition, the processor 130 may analyze the brightness of the plurality of images photographed on the basis of the plurality of preliminary photographing parameters to set the preliminary photographing parameters corresponding to the plurality of user's face regions among the plurality of preliminary photographing parameters to the plurality of photographing parameters.

As an embodiment of the present disclosure, in the case in which the image photographed on the basis of the first preliminary photographing parameter of the plurality of preliminary photographing parameters has the brightness value in the predetermined range with respect to the central region of the user's face, the processor 130 may set the first preliminary photographing parameter to the first photographing parameter corresponding to the central region of the user's face. In addition, in the case in which the image photographed on the basis of the second preliminary photographing parameter of the plurality of preliminary photographing parameters has the brightness value in the predetermined range with respect to the outer region of the user's face, the processor 130 may set the second preliminary photographing parameter to the second photographing parameter corresponding to the outer region of the user's face. That is, the processor 130 may set preliminary photographing parameter having optimal brightness values in the central region and the outer region of the user's face to photographing parameters corresponding to the respective regions.

In this case, an intensity of the light source included in the photographing parameter corresponding to the central region of the user's face may be weaker than that of the light source included in the photographing parameter corresponding to the outer region of the user's face. In addition, a shutter speed included in the photographing parameter corresponding to the central region of the user's face may be greater than that included in the photographing parameter corresponding to the outer region of the user's face. In addition, an F No (opening value) included in the photographing parameter corresponding to the central region of the user's face may be smaller than that included in the photographing parameter corresponding to the outer region of the user's face. In addition, an exposure value included in the photographing parameter corresponding to the central region of the user's face may be smaller than that included in the photographing parameter corresponding to the outer region of the user's face.

The user's face is divided into two regions (for example, the central region and the outer region) in the abovementioned embodiment, but this is only an example, and the user's face may be divided into three or more regions and photographing parameters corresponding to the respective regions may be set.

In addition, the processor 130 may photograph the user's face on the basis of the plurality of photographing parameters that are set, through the camera 110 to obtain the plurality of images. For example, the processor 130 may obtain the first image photographed using the first photographing parameter and the second image photographed using the second photographing parameter.

Figure 5A:
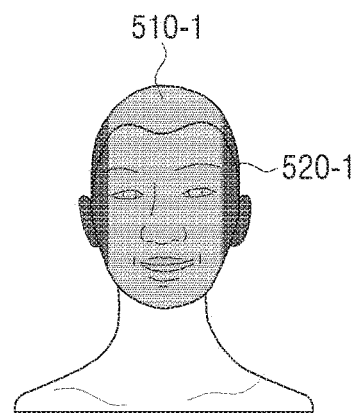
FIGS. 5A, 5B and 5C are views for describing examples of analyzing a user's skin using a skin analyzing application according to an embodiment of the present disclosure.
Figure 5B:
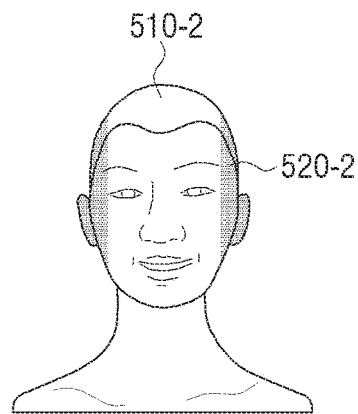
Figure 5C:
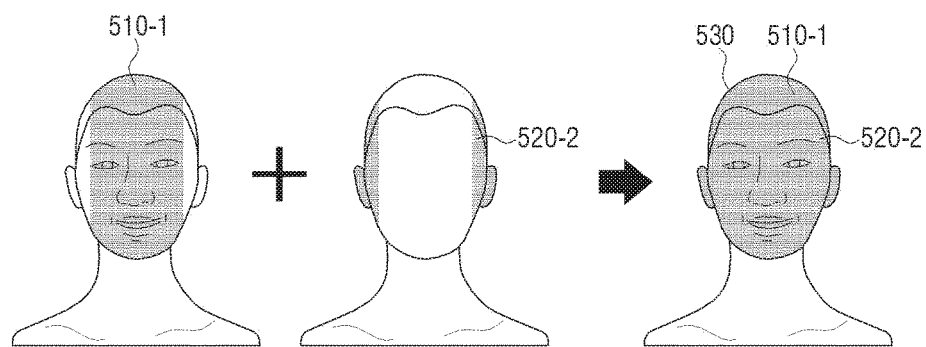

FIGS. 5A, 5B and 5C are views for describing examples of analyzing a user's skin using a skin analyzing application according to an embodiment of the present disclosure.

Referring to FIG. 5A, the first image may include a central region 510-1 having a brightness value in a first range and an outer region 520-1 having a brightness value in a second range, as illustrated in FIG. 5A.

Referring to FIG. 5B, the second image may include a central region 510-2 having a brightness value in a third range and an outer region 520-2 having a brightness value in a fourth range, as illustrated in FIG. 5B. Here, the first range and the fourth range may have an overlapping section existing therebetween. That is, the first range and the fourth range may have the same or similar brightness value.

In addition, the processor 130 may extract the user's face regions corresponding to each of the plurality of images from the plurality of images, and synthesize the extracted user's face regions with each other to create the synthesized image.

Referring to FIG. 5C, the processor 130 may extract the central region 510-1 corresponding to the first image from the first image, extract the outer region 520-2 corresponding to the second image from the second image, and synthesize the central region 510-1 corresponding to the first image and the outer region 520-2 corresponding to the second image with each other to create a synthesized image 530 for the user's face, as illustrated in FIG. 5C. In this case, an entire face region of the synthesized image 530 may have an entirely uniform brightness value, as illustrated in FIG. 5C.

In this case, the processor 130 may correct the first and second regions depending on the motion information of the electronic apparatus 100 or the user sensed through the sensor 180, and then synthesize the corrected first and second regions with each other.

In detail, in the case in which the user photographs his/her face using the electronic apparatus 100, the electronic apparatus 100 may be shaken for example. Therefore, when the processor 130 synthesizes the first region extracted from the first image and the second region extracted from the second image with each other, the processor 130 may move and correct at least one of the first and second regions depending on the motion information of the electronic apparatus 100 sensed through the sensor 180, and then synthesize the moved and corrected first and second regions with each other. In this case, the processor 130 may correct the first region and the second region, but this is only an example, and the processor 130 may correct at least one of the first image and the second image before extracting the first region and the second region.

In addition, the processor 130 may decide the brightness value difference between the first region and the second region in the vicinity of the boundary between the first region and the second region, decide the synthesis weight for at least one of the first region and the second region on the basis of the brightness value difference, and adjust brightness of at least one of the first region and the second region on the basis of the synthesis weight, and then synthesize the first region and the second region with each other. For example, in the case in which a brightness value of the first region is greater than that of the second region by "a" in the vicinity of the boundary between the first region and the second region, the processor 130 may increase the brightness value as a synthesis weight for the second region by "a", and then synthesize the first region and the second region with each other.

As described above, a more accurate synthesized image for the user's face may be obtained through motion correction and brightness correction.

In addition, the processor 130 may control the communicator 120 to transmit the synthesized image for the user's face to the user terminal 200.

FIGS. 6A, 6B, 6C, 6D and 6E are views for describing examples of analyzing a user's skin using a skin analyzing application according to an embodiment of the present disclosure.

Figure 6A:
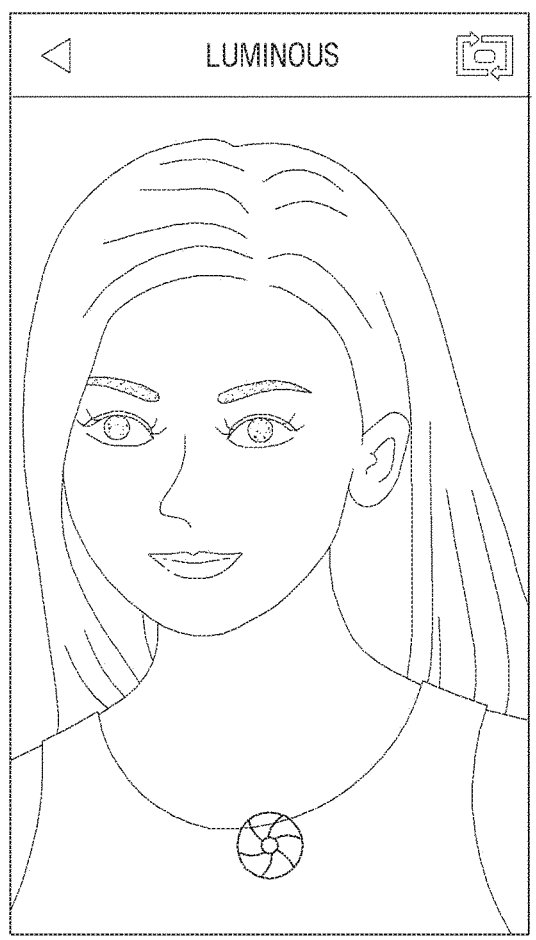
FIGS. 6A, 6B, 6C, 6D and 6E are views for describing examples of analyzing a user's skin using a skin analyzing application according to an embodiment of the present disclosure.

In the case in which the synthesized image for the user's face is received, the user terminal 200 may display the synthesized image for the user's face, as illustrated in FIG. 6A.

Referring to FIG. 6A, the user terminal 200 may analyze the skin state for the user's face on the basis of the synthesized image.

As an embodiment of the present disclosure, the user terminal 200 may separate the synthesized image into a melanin image and a hemoglobin image using pigment separation technology. In addition, the user terminal 200 may analyze the melanin image to obtain information on macula and a skin tone. In addition, the user terminal 200 may analyze the hemoglobin image to obtain information on erythema existing on the user's face.

In addition, as another embodiment of the present disclosure, the user terminal 200 may analyze RGB of the synthesized image to obtain information on a pimple (for example, information on whether or not the pimple is generated, a probability that the pimple will be generated, and the like) existing on the user's face.

In addition, as another embodiment of the present disclosure, the user terminal 200 may obtain information on sebum existing on the user's face from an ultraviolet (UV) image of the synthesized image.

In addition, as another embodiment of the present disclosure, the user terminal 200 may analyze RGB of the synthesized image to obtain information on a pore (for example, information on whether or not the pore exists, a depth of the pore, and the like) existing on the user's face.

In addition, as another embodiment of the present disclosure, the user terminal 200 may analyze RGB of the synthesized image to obtain information on a wrinkle (for example, information on whether or not the wrinkle exists, a depth of the wrinkle, and the like) existing on the user's face.

In addition, as another embodiment of the present disclosure, the user terminal 200 may analyze RGB of the synthesized image to obtain information on a scar (for example, information on whether or not the scar exists, a depth of the scar, and the like) existing on the user's face.

Figure 6B:
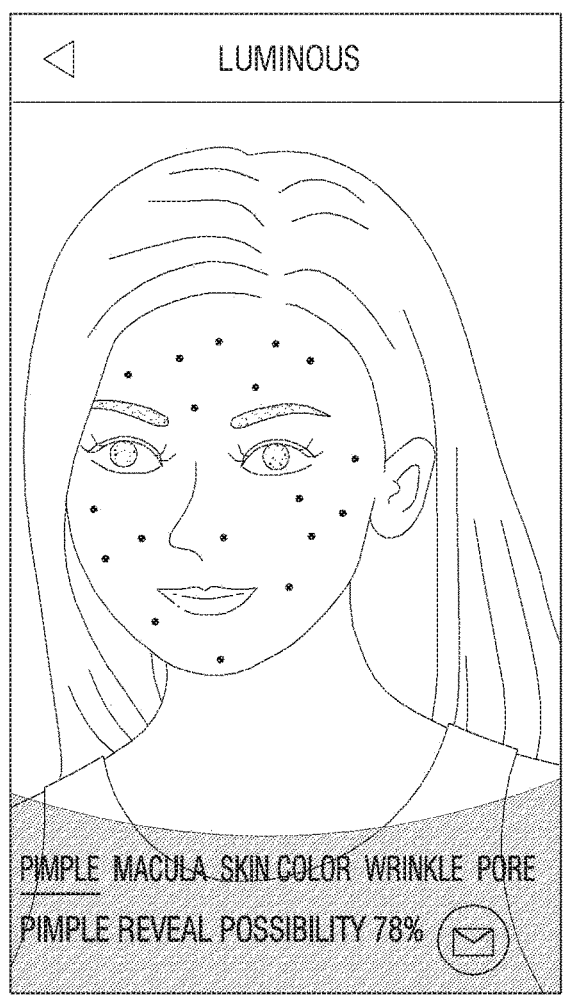

Referring to FIG. 6B, the user terminal 200 may output the obtained information on the skin state of the user's face. For example, the user terminal 200 may display a UI visually providing the information on the skin state, as illustrated in FIG. 6B.

Figure 6C:
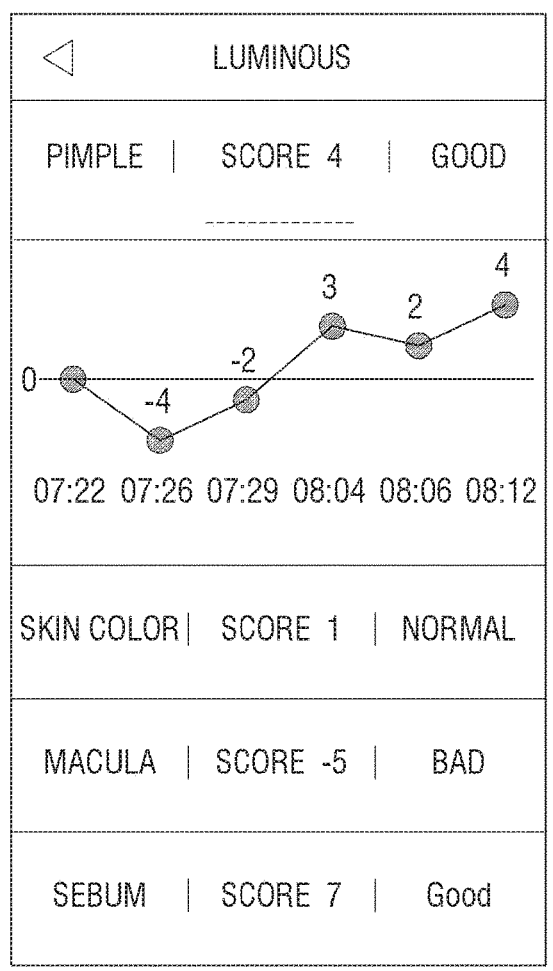

Referring to FIG. 6C, the user terminal 200 may display a UI including history information on the analyzed skin state, as illustrated in FIG. 6C.

Figure 6D:
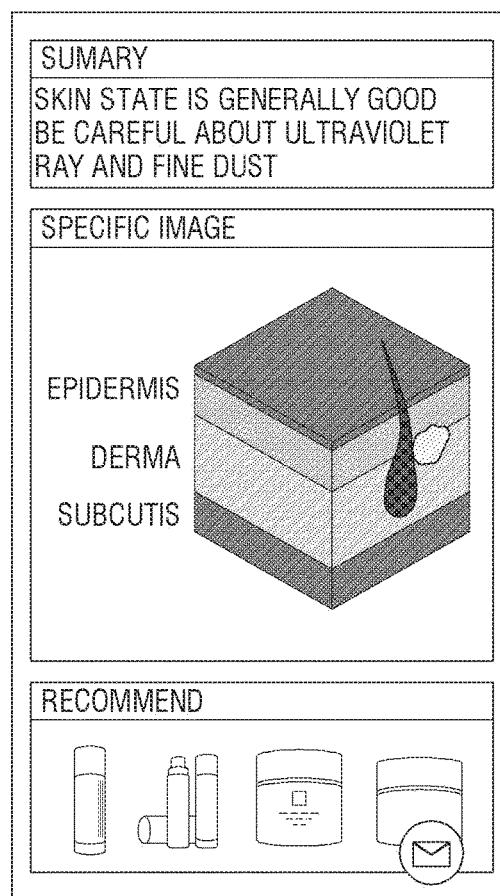

Referring to FIG. 6D, the user terminal 200 may display a UI providing skin trouble prevention information and information on recommended cosmetics, as illustrated in FIG. 6D.

Figure 6E:

Referring to FIG. 6E, the user terminal 200 may provide a chatting service with a skin counselor, as illustrated in FIG. 6E.

According to the various embodiments of the present disclosure as described above, a face image having a uniform brightness distribution over an entire region of the user' face may be obtained to increase accuracy of a face skin analyzing result. In addition, since the user's face does not need to be inserted into the electronic apparatus, the electronic apparatus may be manufactured having a small size and a light weight, such that convenience in carrying the electronic apparatus may be improved.

A case in which the electronic apparatus 100 creates the synthesized image and transmits the synthesized image to the user terminal 200 and the user terminal 200 analyzes the synthesized image to obtain the information on the skin state of the user's face is described in the abovementioned embodiment, but this is only an example, and the electronic apparatus 100 may directly analyze the synthesized image to obtain the information on the skin state of the user's face.

FIG. 7 is a sequence diagram for describing a control method of a system for analyzing the skin of a user's face according to an embodiment of the present disclosure.

Referring to FIG. 7, the electronic apparatus 100 sets the plurality of photographing parameters at S710. In this case, the electronic apparatus 100 may set the preliminary photographing parameters by which images having optimal brightness values may be obtained with respect to the respective regions of the user's face among the plurality of preliminary photographing parameters to the plurality of photographing parameters.

In addition, the electronic apparatus 100 and the user terminal 200 perform communication with each other at S720. In another embodiment of the present disclosure, S710 may be performed after S720.

The electronic apparatus 100 obtains the plurality of images using the plurality of photographing parameters at S730. In detail, the electronic apparatus 100 may photograph the user's face on the basis of the plurality of photographing parameters to obtain the plurality of images.

The electronic apparatus 100 creates the synthesized image at S740. In detail, the electronic apparatus 100 may extract the user's face regions corresponding to each of the plurality of images obtained by the plurality of photographing parameters, and synthesize the extracted user's face regions with each other to create the synthesized image.

The electronic apparatus 100 transmits the synthesized image to the user terminal 200 at S750.

The user terminal 200 analyzes the synthesized image at S760. Particularly, the user terminal 200 may analyze the synthesized image to obtain the information (for example, a pimple, a color tone, a wrinkle, and the like) on the skin state of the user's face.

The user terminal 200 provides the information on the skin state of the user's face at S770.

A case in which the electronic apparatus 100 synthesizes the plurality of images photographed on the basis of the plurality of photographing parameters with each other to be one image is described in the abovementioned embodiment, but this is only an example, and the electronic apparatus 100 may obtain the plurality of images, transmit the plurality of images to the user terminal 200, and the user terminal 200 may synthesize the plurality of images with each other to be one image.

Figure 8:
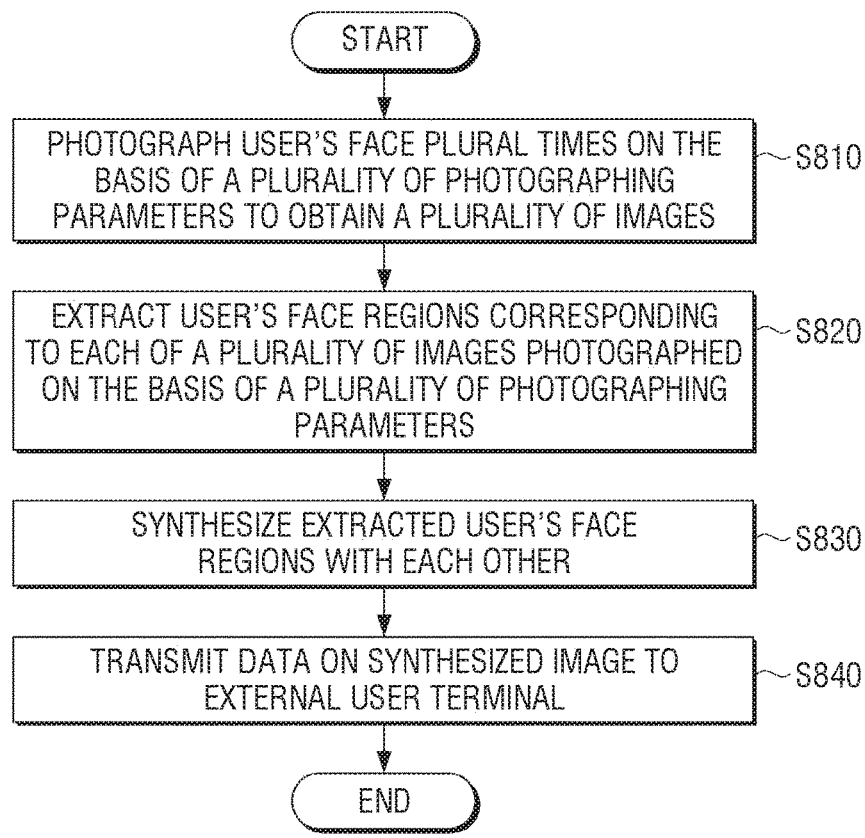
FIGS. 8 and 9 are flowcharts for describing control methods of an electronic apparatus according to an embodiment of the present disclosure.

FIG. 8 is a flowchart for describing a method in which an electronic apparatus obtains information on a skin state of a user's face by transmitting a synthesized image to a user terminal, according to an embodiment of the present disclosure.

Referring to FIG. 8, the electronic apparatus 100 photographs the user's face a plurality of times on the basis of the plurality of photographing parameters to obtain the plurality of images at S810. Here, the plurality of photographing parameters may be predetermined. For example, the electronic apparatus 100 may obtain the first image using the first photographing parameter, and obtain the second image using the second photographing parameter.

In addition, the electronic apparatus 100 extracts the user's face regions corresponding to each of the plurality of images photographed on the basis of the plurality of photographing parameters at S820. For example, the electronic apparatus 100 may extract the central region of the user's face from the first image, and extract the outer region of the user's face from the second image.

In addition, the electronic apparatus 100 synthesizes the extracted user's face regions with each other at S830. For example, the electronic apparatus 100 may synthesize the central region extracted from the first image and the outer region extracted from the second image with each other to obtain the synthesized image for the user's face.

The electronic apparatus 100 transmits the data on the synthesized image to the user terminal 200 at S840.

Figure 9:
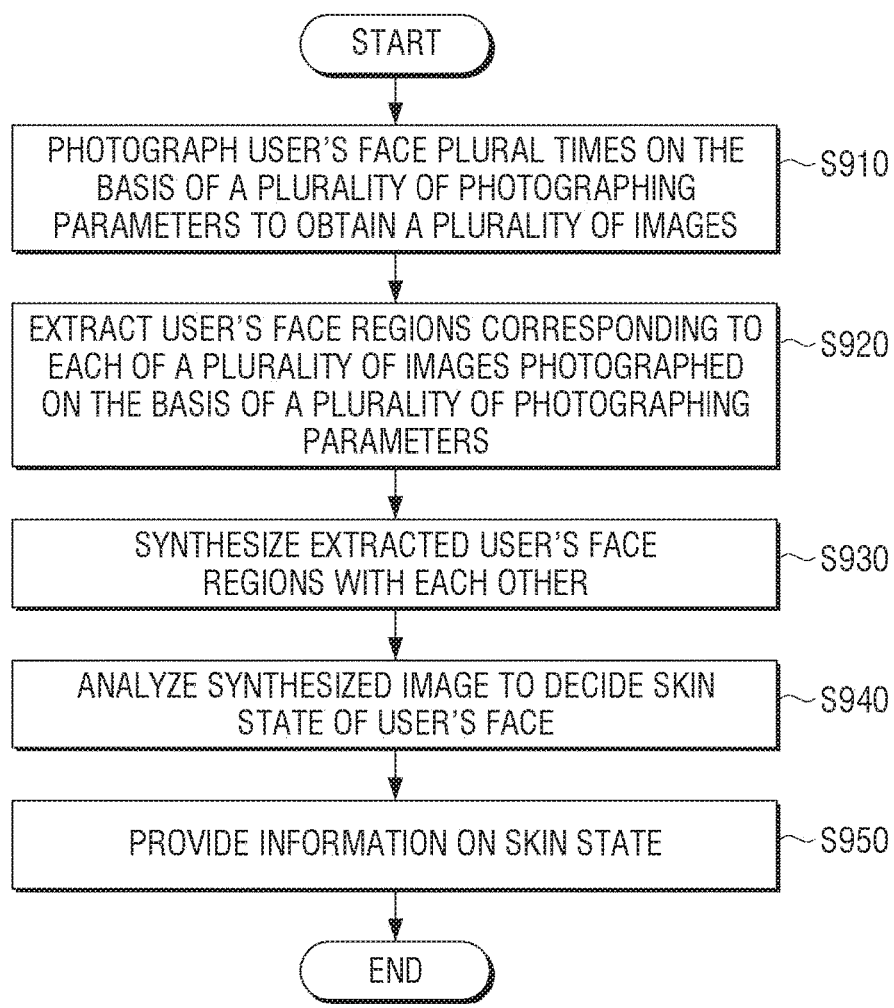

FIG. 9 is a flowchart for describing a method in which an electronic apparatus directly obtains information on a skin state of a user's face, according to an embodiment of the present disclosure.

Referring to FIG. 9, S910 to S930 illustrated in FIG. 9 are the same as S810 to S830 described above with reference to FIG. 8, and an overlapping description will thus be omitted.

In addition, the electronic apparatus 100 analyzes the synthesized image to decide the skin state of the user's face at S940. In detail, the electronic apparatus 100 may analyze the synthesized image to obtain various information on the skin state such as a skin tone, as well as skin troubles (for example, a pimple, a pore, a wrinkle, and the like) of the user's face.

The electronic apparatus 100 provides the information on the decided skin state at S950. In this case, the electronic apparatus 100 may visually provide the information on the skin state and the service through the various UIs as illustrated in FIGS. 6A to 6E, but this is only an example, and the electronic apparatus 100 may provide the information on the skin state in an auditory form.

The methods described above may be implemented in a form of program commands that may be executed through various computer means and may be recorded in a computer-readable recording medium. The computer-readable recording medium may include a program command, a data file, a data structure or the like, alone or a combination thereof. The program commands recorded in the computer-readable recording medium may be especially designed and configured for the present disclosure or be known to those skilled in a field of computer software. Examples of the computer-readable recording medium may include a magnetic medium such as a hard disk, a floppy disk, and a magnetic tape; an optical medium such as a compact disk read only memory (CD-ROM) or a digital versatile disk (DVD); a magneto-optical medium such as a floptical disk; and a hardware device specially configured to store and execute program commands, such as a ROM, a random access memory (RAM), a flash memory, or the like. Examples of the program commands include a high-level language code capable of being executed by a computer using an interpreter, or the like, as well as a machine language code made by a compiler. The abovementioned hardware device may be constituted to be operated as one or more software modules to perform an operation according to the present disclosure, and vice versa.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
a camera configured to photograph a user's face;
a transceiver configured to perform communication with a user terminal; and
at least one processor configured to:
control the camera to photograph the user's face a plurality of times based on a plurality of photographing parameters to obtain a plurality of images,
extract face regions corresponding to each of the plurality of images photographed based on the plurality of photographing parameters,
synthesize the extracted face regions with each other to create a synthesized image, and
control the transceiver to transmit data on the synthesized image to the user terminal for skin analysis of the user's face,
wherein the at least one processor is further configured to:
extract a first region of the user's face, corresponding to a predetermined range of a brightness value, from a first image photographed based on a first photographing parameter,
extract a second region of the user's face, corresponding to a predetermined range of a brightness value, from a second image photographed based on a second photographing parameter, and
synthesize the first region extracted from the first image and the second region extracted from the second image with each other.

2. The electronic apparatus of claim 1, wherein the at least one processor is further configured to:
control the camera to photograph the user's face a plurality of times based on a plurality of preliminary photographing parameters, and
analyze a brightness of a plurality of images photographed based on the plurality of preliminary photographing parameters to set preliminary photographing parameters corresponding to a plurality of face regions among the plurality of preliminary photographing parameters to the plurality of photographing parameters.

3. The electronic apparatus of claim 2, wherein the at least one processor is further configured to:
set a first preliminary photographing parameter to the first photographing parameter corresponding to the first region of the user's face in a case in which an image photographed based on the first preliminary photographing parameter of the plurality of preliminary photographing parameters has the brightness value in the predetermined range with respect to the first region of the user's face, and
set a second preliminary photographing parameter to the second photographing parameter corresponding to the second region of the user's face in a case in which an image photographed based on the second preliminary photographing parameter of the plurality of preliminary photographing parameters has the brightness value in the predetermined range with respect to the second region of the user's face.

4. The electronic apparatus of claim 1, wherein the at least one processor is further configured to:
correct the first and second regions depending on sensed motion information of the electronic apparatus, and
synthesize the corrected first and second regions with each other.

5. The electronic apparatus of claim 1, wherein the at least one processor is further configured to:
decide a brightness value difference between the first region and the second region in a vicinity of a boundary between the first region and the second region,
decide a synthesis weight for at least one of the first region and the second region based on the brightness value difference,
adjust a brightness of at least one of the first region and the second region based on the synthesis weight, and
synthesize the first region and the second region with each other.

6. The electronic apparatus of claim 2, wherein the plurality of preliminary photographing parameters are determined depending on an external illumination environment.

7. The electronic apparatus of claim 1, wherein the first photographing parameter is at least one of an intensity of a light source included in the electronic apparatus, a shutter speed, or an opening value.

8. The electronic apparatus of claim 1, further comprising a display,
wherein the at least one processor is further configured to:
analyze the synthesized image to obtain skin state information on at least one of a pigmentation, a pimple, sebum, a pore, or a wrinkle existing on the user's face, and
control the display to output the obtained skin state information.

9. A control method of an electronic apparatus, the method comprising:
photographing a user's face a plurality of times based on a plurality of photographing parameters to obtain a plurality of images;
extracting face regions corresponding to each of the plurality of images photographed based on the plurality of photographing parameters;
synthesizing the extracted face regions with each other to create a synthesized image; and
transmitting data on the synthesized image to a user terminal for skin analysis of the user's face, wherein the synthesizing comprises:
extracting a first region of the user's face, corresponding to a predetermined range of a brightness value, from a first image photographed based on a first photographing parameter;
extracting a second region of the user's face, corresponding to a predetermined range of a brightness value, from a second image photographed based on a second photographing parameter; and
synthesizing the first region extracted from the first image and the second region extracted from the second image with each other.

10. The control method of claim 9, further comprising:
photographing the user's face a plurality of times based on a plurality of preliminary photographing parameters; and
analyzing a brightness of a plurality of images photographed based on the plurality of preliminary photographing parameters to set preliminary photographing parameters corresponding to a plurality of face regions among the plurality of preliminary photographing parameters to the plurality of photographing parameters.

11. The control method of claim 10,
wherein a first preliminary photographing parameter is set to the first photographing parameter corresponding to the first region of the user's face in a case in which an image photographed based on the first preliminary photographing parameter of the plurality of preliminary photographing parameters has the brightness value in the predetermined range with respect to the first region of the user's face, and
wherein a second preliminary photographing parameter is set to the second photographing parameter corresponding to the second region of the user's face in a case in which an image photographed based on the second preliminary photographing parameter of the plurality of preliminary photographing parameters has the brightness value in the predetermined range with respect to the second region of the user's face.

12. The control method as claimed in claim 9, wherein the synthesizing further comprises:
correcting the first and second regions depending on sensed motion information of the electronic apparatus; and
synthesizing the corrected first and second regions with each other.

13. The control method as claimed in claim 9, wherein the synthesizing further comprises:
deciding a brightness value difference between the first region and the second region in a vicinity of a boundary between the first region and the second region;
deciding a synthesis weight for at least one of the first region and the second region based on the brightness value difference;
adjusting a brightness of at least one of the first region and the second region based on the synthesis weight; and
synthesizing the first region and the second region with each other.

14. The control method of claim 10, wherein the plurality of preliminary photographing parameters are determined depending on an external illumination environment.

15. The control method of claim 9, wherein the first photographing parameter is at least one of an intensity of a light source included in the electronic apparatus, a shutter speed, or an opening value.

16. The control method of claim 9, further comprising:
analyzing the synthesized image to obtain skin state information on at least one of a pigmentation, a pimple, sebum, a pore, or a wrinkle existing on the user's face; and
outputting the obtained skin state information.

17. A non-transitory computer-readable recording medium in which a program for executing a control method of an electronic apparatus is stored, wherein the control method includes:
photographing a user's face a plurality of times based on a plurality of photographing parameters to obtain a plurality of images;
extracting face regions corresponding to each of the plurality of images photographed based on the plurality of photographing parameters and synthesizing the extracted face regions with each other to create a synthesized image;
analyzing the synthesized image to decide a skin state of the user's face; and
providing information on the skin state,
wherein the synthesizing comprises:
extracting a first region of the user's face, corresponding to a predetermined range of a brightness value, from a first image photographed based on a first photographing parameter;
extracting a second region of the user's face, corresponding to a predetermined range of a brightness value, from a second image photographed based on a second photographing parameter; and
synthesizing the first region extracted from the first image and the second region extracted from the second image with each other.

* * * * *